United States Patent
Gu et al.

(10) Patent No.: US 11,108,612 B2
(45) Date of Patent: Aug. 31, 2021

(54) ANTI-INTERFERENCE SIGNAL DETECTION AND SYNCHRONIZATION METHOD FOR WIRELESS BROADBAND COMMUNICATION SYSTEM

(71) Applicant: NATIONAL UNIVERSITY OF DEFENSE TECHNOLOGY, Hunan (CN)

(72) Inventors: Fanglin Gu, Hunan (CN); Jibo Wei, Hunan (CN); Jian Wang, Hunan (CN); Jun Xiong, Hunan (CN); Dongtang Ma, Hunan (CN)

(73) Assignee: NATIONAL UNIVERSITY OF DEFENSE TECHNOLOGY, Hunan (CN)

( * ) Notice: Subject to any disclaimer, the term of this patent is extended or adjusted under 35 U.S.C. 154(b) by 0 days.

(21) Appl. No.: 16/768,688

(22) PCT Filed: Jul. 5, 2018

(86) PCT No.: PCT/CN2018/094624
§ 371 (c)(1),
(2) Date: May 31, 2020

(87) PCT Pub. No.: WO2019/119778
PCT Pub. Date: Jun. 27, 2019

(65) Prior Publication Data
US 2021/0194743 A1    Jun. 24, 2021

(30) Foreign Application Priority Data
Dec. 22, 2017 (CN) .......................... 201711398870.9

(51) Int. Cl.
*H04L 27/06*    (2006.01)
*H04L 27/26*    (2006.01)

(52) U.S. Cl.
CPC ...... *H04L 27/2656* (2013.01); *H04L 27/2659* (2013.01)

(58) Field of Classification Search
CPC . H04L 27/2656; H04L 27/2659; H04B 1/709; H04B 1/7097
(Continued)

(56) References Cited

U.S. PATENT DOCUMENTS 5,963,582 A * 10/1999 Stansell, Jr. ............ G01S 19/22
370/320
2007/0025236 A1* 2/2007 Ma ....................... H04L 27/2613
370/208
(Continued)

FOREIGN PATENT DOCUMENTS

| CN | 101815048 A | 8/2010 |
|---|---|---|
| CN | 102075486 A | 5/2011 |

(Continued)

OTHER PUBLICATIONS

International Search Report for PCT/CN2018/094624 dated Sep. 27, 2018, ISA/CN.

*Primary Examiner* — Don N Vo
(74) *Attorney, Agent, or Firm* — Yue (Robert) Xu; Apex Attorneys at Law, LLP (57) ABSTRACT

An anti-interference signal detection and synchronization method for a wireless broadband communication system. The method uses the peak value of a cross-correlation value of a received signal and a local sequence as a basis for determining signal detection and system synchronization. Because the cross-correlation value of the received signal and the local sequence is less affected by a signal-to-noise ratio and interference signals, the method can adapt to signal changes, can effectively alleviate the frame loss problem of a received signal autocorrelation based scheme under a low (Continued)

signal-to-noise ratio and interference condition, and also has good anti-noise and anti-interference capabilities.

8 Claims, 7 Drawing Sheets

(58) Field of Classification Search
USPC .................................................. 375/150, 343
See application file for complete search history.

(56) References Cited

U.S. PATENT DOCUMENTS

| | | | | |
|---|---|---|---|---|
| 2009/0245287 | A1* | 10/2009 | Mueller | H04L 27/2613 |
| | | | | 370/476 |
| 2017/0257248 | A1* | 9/2017 | Zhao | H04L 27/06 |
| 2018/0212749 | A1* | 7/2018 | Au Yeung | H04L 25/03019 |
| 2018/0220387 | A1* | 8/2018 | Ji | H04L 27/2662 |

FOREIGN PATENT DOCUMENTS

| | | |
|---|---|---|
| CN | 102263767 A | 11/2011 |
| CN | 106130945 A | 11/2016 |
| CN | 108040028 A | 5/2018 |
| EP | 1662736 A2 | 5/2006 |

\* cited by examiner

ANTI-INTERFERENCE SIGNAL DETECTION AND SYNCHRONIZATION METHOD FOR WIRELESS BROADBAND COMMUNICATION SYSTEM

The application is the national phase of International Application No. PCT/CN2018/094624, titled "ANTI-INTERFERENCE SIGNAL DETECTION AND SYNCHRONIZATION METHOD FOR WIRELESS BROADBAND COMMUNICATION SYSTEM", filed on Jul. 5, 2018, which claims the priority to Chinese Patent Application No. 201711398870.9, titled "ANTI-INTERFERENCE SIGNAL DETECTION AND SYNCHRONIZATION METHOD FOR OFDM SYSTEM BASED ON LOCAL SEQUENCE CROSS-CORRELATION DETECTION", filed on Dec. 22, 2017 with the China National Intellectual Property Administration, both of which are incorporated herein by reference in their entireties.

TECHNICAL FIELD

The present disclosure relates to communication technologies, and in particular to mobile communication technologies.

BACKGROUND

Figure 1:
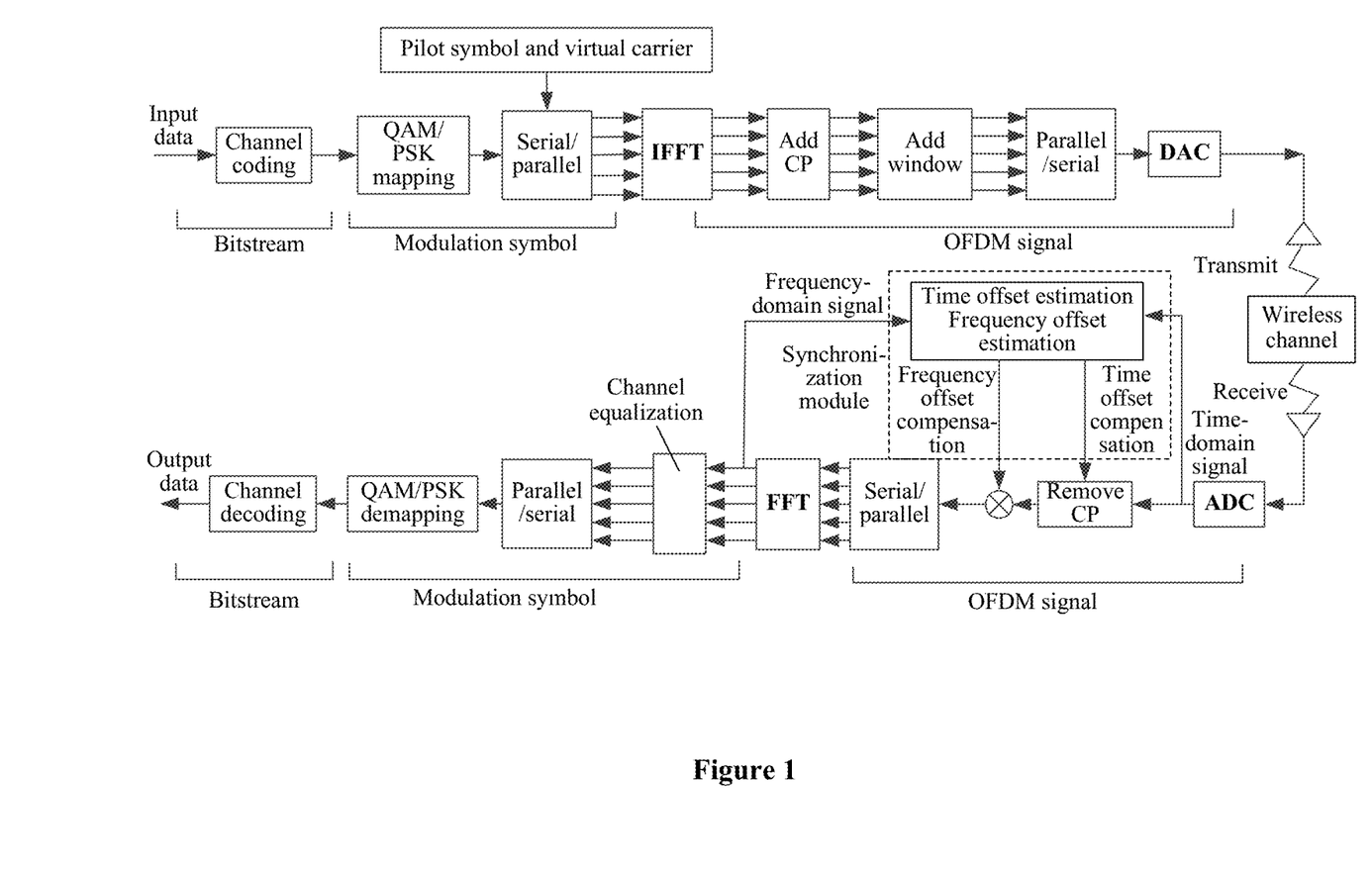
FIG. 1 is a schematic diagram showing a model of a receiver and a transmitter in an OFDM system.

In recent years, there has been an increasing demand for system transmission capacity both in civil communications and military communications. Great progress has been made in theories and technologies of broadband wireless communication. The Orthogonal Frequency Division Multiplexing (OFDM) transmission system and the Single-Carrier Frequency Domain Equalization (SCFDE) transmission system, in which synchronization is one of key factors which affect performance of the system, have been two typical transmission solutions for current broadband wireless communications. The OFDM system is similar to the SCFDE system in many aspects, especially synchronization modules in the two systems have almost identical processing procedures. Therefore, an OFDM system is taken as an example to explain a method according to the present disclosure. FIG. 1 shows schematic diagram of a model of an OFDM system. Channel coding, Quadrature Amplitude Modulation (QAM) mapping, Inverse Fast Fourier Transform (IFFT) are performed on data sent by the system, and a Cyclic Prefix (CP) is added to obtain an OFDM signal. The OFDM signal is transmitted via a wireless channel. At a receiver, a synchronization process is performed on a received signal, and symbol timing and carrier frequency deviation are estimated and compensated to ensure that subsequent processes such as QAM demapping and channel decoding can be correctly performed.

Synchronization in the OFDM system mainly includes symbol timing synchronization and carrier synchronization. The symbol timing synchronization is performed such that the receiver obtains the same symbol period sequence used at the transmitter to determine a correct starting position of a Fast Fourier Transform (FFT) window function. In the OFDM system in which Cyclic Prefix is used, a cyclic prefix is added in the front of each OFDM symbol to resist multipath interference and tolerate effects of timing errors. Therefore, under the condition that a length of the cyclic prefix is greater than a maximum delay extension, inter-symbol interference due to multipath interference may be eliminated to the maximum extent. The carrier synchronization is performed to overcome a frequency offset between the receiver and the transmitter caused by mismatch of crystal oscillators of the transmitter and the receiver and Doppler frequency shift, such that the transmitter and the receiver work at a same carrier frequency, thereby ensuring orthogonality between subcarriers to eliminate inter-carrier interference. In summary, the OFDM system has less strict requirement for accuracy of symbol timing synchronization, but has strict requirement for carrier synchronization, since the OFDM symbol is formed by superimposing multiple subcarrier signals, which are distinguished by orthogonality.

In the OFDM system, subcarrier spacing is generally used to normalize a carrier frequency offset, thus the carrier frequency offset may be divided into an integer frequency offset and a fractional frequency offset. The integer frequency offset does not destroy the orthogonality of the subcarrier frequency components, but causes cyclic shift which significantly reduces the Bit Error Rate (BER) performance of the OFDM system. The fractional frequency offset destroys the orthogonality between subcarriers, resulting in inter-subcarrier interference. Therefore, a frequency offset estimation method capable of estimating both the integer frequency offset and the fractional frequency offset is required.

Synchronization in the OFDM system has been studied a lot. In an actual system, a synchronization method based on a training sequence is generally used. Although the use of a training sequence reduces transmission efficiency of the system, it is worthwhile to increase the synchronization speed, synchronization accuracy, and synchronization stability at the cost of certain transmission efficiency. Among synchronization methods based on a training sequence in the OFDM system, the Schmidl algorithm, the Minn algorithm, and the Park algorithm are well known method. Basic ideas of these algorithms include: the transmitter transmitting a training sequence having a specific repetitive structure, and the receiver calculating delay autocorrelation of a received signal, and on this basis, detecting a peak value of a delay autocorrelation function and using phase information of the peak value to perform symbol timing synchronization and estimate carrier frequency offset. However, there are two main problems in the method based on detection of the peak value of a delay autocorrelation function. The first problem is that, at a low signal-to-noise ratio, the peak value of the delay autocorrelation function is susceptible to noise and other factors, resulting in low accuracy of the detection. In order to ensure the accuracy of the detection, the length of the training sequence is generally increased, resulting in reduction of transmission efficiency of the system. The second problem is that these algorithms are unsuitable if the system is disturbed, since an interfering signal (such as single-tone interference and multi-tone interference) generally has a repetitive structure, causing failure in detection of the peak value of the delay autocorrelation function.

SUMMARY

In order to solve the problem that the synchronization method based on detection of the peak value of the autocorrelation function in the conventional technology is constraint by a detection threshold and is susceptible to an interference signal, which causes false synchronization, an anti-interference signal detection and synchronization method based on detection of peak values of a cross-correlation function of a received signal and a local sequence is provided according to the present disclosure. The method includes: designing a training sequence having a specific repetitive structure and meeting requirements of coarse frequency offset estimation and fine frequency offset estimation, calculating a cross-correlation function of a received signal and a local sequence, detecting a peak value of the cross-correlation function, and estimating a frequency offset. The method is creative in that, synchronization performance of the system is not constraint by a detection threshold and is insusceptible to an interference signal, good synchronization performance can be achieved even under a low signal-to-noise ratio condition, and both coarse frequency estimation and fine frequency estimation can be performed with stability and estimation accuracy. In particular, a calculation method for calculating a cross-correlation function of a received signal and a local sequence is provided according to the present disclosure. The method has low complexity and is easy to implement by hardware.

Assuming that N is the number of IFFT (FFT) points of OFDM, $N_u$ is the number of non-virtual subcarriers, a cyclic prefix having a length of $N_G$ is added in the front of each OFDM symbol, and X(k) represents a frequency domain symbol modulated by using a k-th subcarrier, a baseband OFDM time domain sample signal x(n) at a transmitter may be expressed as:

$$x(n) = \frac{1}{\sqrt{N}} \sum_{k=0}^{N_u-1} X(k)\exp(j2\pi kn/N), \quad (1)$$

where, $n \in [-N_G, N-1]$, and j is equal to $\sqrt{-1}$.

It is assumed that an impulse response h(n) of a multipath fading channel is:

$$h(n) = \sum_{l=0}^{L-1} h_l \delta(n - \tau_l) \quad (2)$$

where, L represents the number of paths, $h_l$ represents a complex gain corresponding to an l-th path, $\tau_l$ represents a delay corresponding to the l-th path, and $\delta(n-\tau_l)$ represents an unit impulse response function. If there is no timing deviation and frequency deviation, a received signal may be expressed as y(n)=x(n)*h(n), where * represents a convolution operation. An FFT operation is performed on the received signal y(n) to obtain a frequency domain expression of the received signal:

$$Y(k) = \sum_{n=0}^{N-1} y(n)e^{-j2\pi kn/N} = \sum_{n=0}^{N-1} \left\{ \sum_{m=0}^{\infty} h(m)x(n-m) + n(n) \right\} e^{-j2\pi kn/N} \quad (3)$$

$$= \sum_{n=0}^{N-1} \left\{ \sum_{m=0}^{\infty} h(m) \left\{ \frac{1}{N} \sum_{i=0}^{N-1} X(i)e^{j2\pi i(n-m)/N} \right\} \right\} e^{-j2\pi kn/N} + W(k)$$

$$= \frac{1}{N} \sum_{n=0}^{N-1} \left\{ \sum_{m=0}^{\infty} h(m)e^{-j2\pi im/N} \left\{ \sum_{i=0}^{N-1} X(i)e^{-j2\pi n(k-i)/N} \right\} \right\} e^{-j2\pi kn/N} + W(k)$$

$$= H(k)X(k) + W(k)$$

where, X(k), Y(k), H(k), W(k) respectively represent a transmitted signal, a received signal, a frequency response of a multipath channel, and a frequency response of noise on the k-th subcarrier. Since the transmitted signal passes through the multipath fading channel, and the transmitted signal is affected by timing deviation and frequency deviation between the receiver and the transmitter, a time domain sample $y_{offset}(n)$ of the received signal is:

$$y_{offset}(n) = \sum_{l=0}^{L-1} h_l x(n - d - \tau_l) e^{j2\pi \varepsilon n/N} + w(n) \quad (4)$$

where, d represents a symbol timing deviation normalized by a sample period, represents a carrier frequency deviation normalized by a subcarrier interval, and w(n) represents an additive white Gaussian noise signal having a mean of 0 and a variance of $\sigma_w^2$.

In order to reduce influences of noise and interference on synchronization in a system, a method based on cross-correlation between a received signal and a local sequence is used to achieve synchronization in an OFDM system to improve synchronization performance of the OFDM system under an interferences and low signal-to-noise ratio condition. Following three problems should be considered to make the method practical:

1. accuracy of symbol timing synchronization and frequency offset estimation under a low signal-to-noise ratio/interferences condition;

2. capability of estimating both an integer subcarrier frequency offset and a fractional subcarrier frequency offset; and 3. moderate-complexity calculation for implementing the method.

Figure 2:
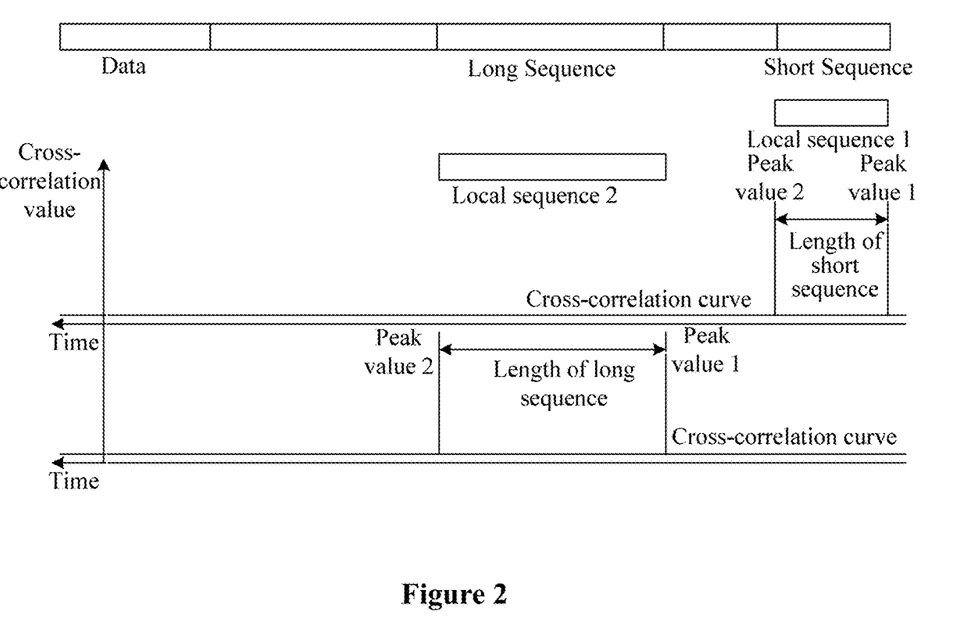
FIG. 2 is a schematic diagram showing a structure of a training sequence in a synchronization method based on local sequence cross-correlation.

In order to solve the above three problems, a training sequence structure shown in FIG. 2 is designed. The training sequence structure includes two repetitive short training sequences and two repetitive long training sequences. Each of the short training sequence and the long training sequence is a pseudo-random sequence having good autocorrelation. The autocorrelation is expressed by following equation (5):

$$R(m) = \sum_{n=0}^{M-1} x(n+m)x^*(n) \xrightarrow{m \neq 0} 0 \quad (5)$$

where, m represents an offset of a sequence, M represents a length of the sequence, and (.)* represents a conjugate operation. The short training sequence has close cross-correlation with the long training sequence, and the short training sequence is not correlated with the long training sequence. Based on auto-correlation and cross-correlation of the training sequence, a cross-correlation function of the received signal and the local sequence is calculated by using following equation (6):

$$R(m) = \sum_{n=0}^{M-1} y_{offset}(n+m) x_{Local}^*(n) \quad (6)$$

where, $x_{Local}(n)$ represents the local sequence, $x_{Local}^*(n)$ represents a conjugate of the local sequence, $y_{offset}(n)$ represents a time domain sample of the received signal, and M represents a length of the local sequence. It is apparent that, a sharp correlation peak value appears in the amplitude of the cross-correlation function of the received signal and the local sequence if the received signal includes a signal that is the same as the local sequence (or has a certain difference from the local sequence), and the cross-correlation function is close to zero at other positions since the training sequence has good autocorrelation. As shown in FIG. 2, the training sequence includes two adjacent repetitive sequences, thus two consecutive peak values appear in the cross-correlation function of the received signal and the local sequence. Therefore, symbol timing synchronization is achieved by accurately detecting the two peak values, and the symbol timing synchronization has high stability and accuracy.

In another aspect, based on the repetitive structure of the training sequence, two consecutive peak values separated apart by a sequence length appear in an absolute value of the cross-correlation function of the received signal and the local sequence. Without considering noise, the two consecutive peak values satisfy a relationship expressed by following equation (7):

$$R^\Delta(M+m)=R^\Delta(m)e^{j2\pi M/N/N} \quad (7)$$

where, $R^\Delta(m)$ represents a cross-correlation value at the peak location of the cross-correlation curve of the received signal and the local sequence. An estimated value $\hat{\varepsilon}$ of the normalized frequency offset $\varepsilon$ may be obtained based on equation (7):

$$\hat{\varepsilon} = \frac{N}{M2\pi} \angle(R^\Delta(M+m)conj(R^\Delta(m))) \quad (8)$$

where, conj(.) represents a conjugate operation, and $\angle$ represents an operation for obtaining a phase between (0, $2\pi$]. It can be seen that an estimated range of the normalized frequency offset is related to the length M of the training sequence. For a certain value of M, a phase of a correlation value corresponding to the normalized frequency offset $\varepsilon$ is to be blurred if the normalized frequency offset $\varepsilon$ exceeds a certain range. Therefore, following conclusions may be obtained: a larger M indicates a smaller estimated range of the normalized frequency offset and a higher estimation accuracy, and a smaller M indicates a larger estimated range of the normalized frequency offset $\varepsilon$ and a lower estimation accuracy.

Since the carrier frequency offset (CFO) is large in an initial stage of the synchronization, a technique is required to estimate a CFO having a large range. Therefore, a training sequence used in an actual system is designed to have a structure as shown in FIG. 2, where the short training sequence is used to perform coarse CFO estimation and compensation. Based on this, the long training sequence is used to perform fine CFO estimation and compensation.

Finally, implementation complexity of the algorithm is considered. A burst OFDM system is mainly considered, in which it is required to capture and synchronize each frame of a signal. Therefore, it is required to constantly calculate a cross-correlation value of the received signal and the local sequence and detect certain features of the cross-correlation function to capture the signal. The cross-correlation function R(m) of the received signal and the local sequence is calculated by using following equation (9):

$$R(m)=\sum_{n=0}^{\infty} y_{offset}(n+m)x_{Local}^*(n)=y_{offset}(n)\otimes x_{Local}(-n) \quad (9)$$

where, $x_{Local}^*(n)$ represents the conjugate of the local sequence, $y_{offset}(n)$ represents a time domain sample of the received signal, and $\otimes$ represents a convolution operation. As can be seen, a strictly calculated cross-correlation between an infinitely long received signal and the local sequence is a sliding cross-correlation, and calculation of the sliding cross-correlation has a great implementation complexity. After analysis, the calculation process of the cross-correlation between the received signal and the local sequence may be equivalent to a convolution process.

Figure 3:
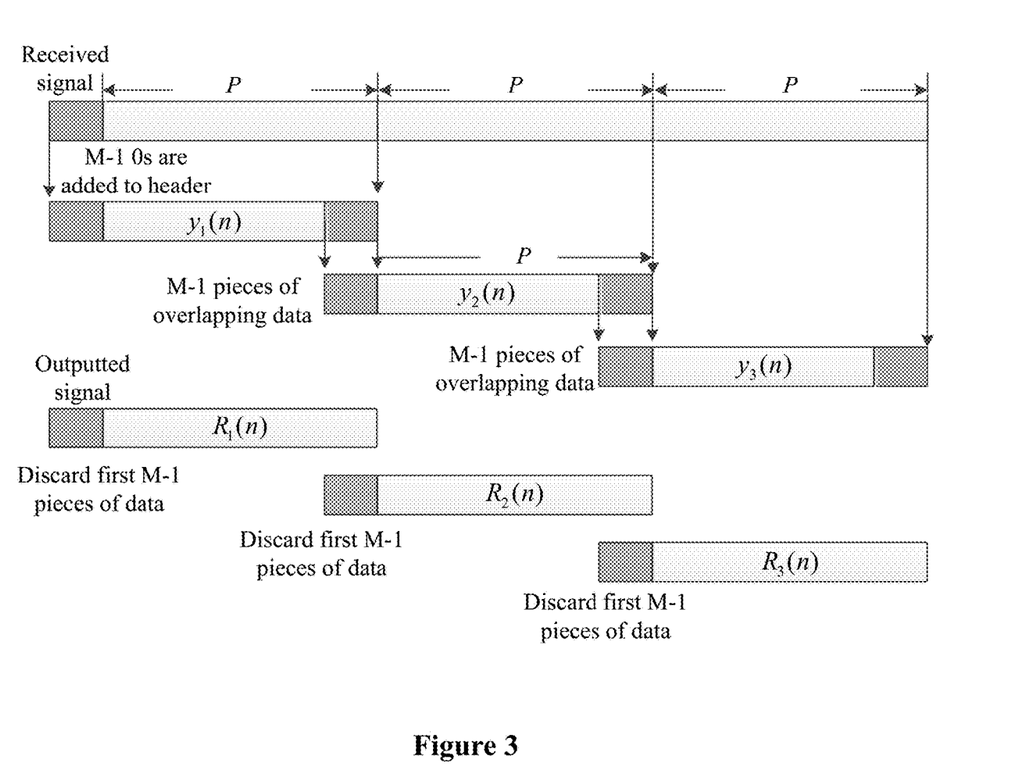
FIG. 3 is a schematic diagram of linear convolution realized by using an overlapping reservation algorithm.

In order to solve the problem of occupying too many resources such as multipliers in implementation of equation (9), fast Fourier transform is used to implement the calculation of equation (9) according to the present disclosure, based on the basic principle that cyclic convolution may be realized by fast Fourier transform. Therefore, linear convolution may be realized with low complexity by using an overlapping reservation algorithm or an overlapping addition algorithm. Taking the overlapping reservation algorithm as an example to illustrate, as shown in FIG. 3, the received signal y(n) is segmented into $y_1(n)$, $y_2(n)$, . . . , each data segment has a length of P+M−1, and two consecutive data segments have M−1 pieces of overlapping data. M−1 0s are added to a header of data of the received signal. P is selected under a condition that P+M−1 is an integer power of 2 to facilitate IFFT transformation.

Then, P+M−1-point FFT transformation is performed on the segmented data, and the data on which FFT transformation is performed is multiplied with the stored frequency domain response of the local sequence, and then IFFT transformation is performed to transform the multiplied result back to time domain to obtain the cross-correlation function of the received signal and the local sequence:

$$R_k(m)=y_k(n)\otimes x_{Local}(-n)=\text{IFFT}[\text{FFT}(y_k(k))\odot \text{FFT}^*(x_{Local}(n))] \quad (10)$$

where, FFT[.] and IFFT[.] respectively represent FFT and IFFT transformations, k represents a k-th data segment after segmentation, and $\odot$ represents a point multiplication operation. Since the frequency domain response FFT*($x_{Local}(n)$) of a filter is constant in one filtering operation, it is only required to calculate the frequency domain response of the filter once or calculate the frequency domain response of the filter offline and store it. Since multiplication in the frequency domain is equivalent to cyclic convolution in the time domain, $R_k(m)$ calculated by using equation (10) is equivalent to a circular convolution result of $y_k(n)$ and $x_{Local}(n)$ in the time domain. First M−1 pieces of data of $R_k(m)$ contains last M−1 pieces of data of $y_{k-1}(n)$, and rest of $R_k(m)$ is a result of linear convolution. Therefore, an equivalent result of the linear convolution may be obtained by discarding first M−1 pieces of data of each $R_k(m)$ and sequentially splicing remaining data.

Finally, the accuracy of peak value detection of the cross-correlation function of the received signal and the local sequence is essential to the performance of the method. In actual implementation, in order to ensure the real-time performance of the system, peak value detection may be performed on a portion of the cross-correlation function, and the peak value detection is usually performed by using a threshold method. However, the peak value detection by using a threshold method is affected by factors such as a signal-to-noise ratio and an inconsistent gain of an automatic gain control (AGC) circuit, a fixed threshold is generally limited to specific scenarios, and a low signal-to-noise ratio condition may cause unstable detection. For example, a level of the received signal can only be limited within a certain range by the AGC, thus the level of the received signal is within the certain range, resulting in a great variation in the value of the cross-correlation function of the received signal and the local sequence. Therefore, it is difficult to select an appropriate threshold. In order to overcome the problem, it is required to normalize the cross-correlation function shown in equation (6). A normalized cross-correlation function $R_{norm}(m)$ is provided based on Parseval's theorem, as expressed by following equation (11):

$$R_{norm}(m) = \frac{\sum_{n=0}^{M-1} y_{offset}(n+m) x_{Local}^*(n)}{0.5(\sum_{n=0}^{M-1} |y_{offset}(n+m)|^2 + \sum_{n=0}^{M-1} |x_{Local}(n)|^2)} \quad (11)$$

where, M represents the length of the local sequence, m represents an offset, $(.)^*$ represents a conjugate operation, $x_{Local}^*(n)$ represents the conjugate of the local sequence, and $y_{offset}(n)$ represents a time domain sample of the received signal.

It can be seen that the normalized cross-correlation function is not to be affected by the level of the received signal, and influences from factors such as noise on the peak value detection of the cross-correlation function can be further reduced, such that the stability of peak value detection is improved.

The beneficial effects of the present disclosure are as follows.

An anti-interference signal detection and synchronization method for a broadband wireless system based on detection of peak values of a cross-correlation function of a local sequence is provided according to the present disclosure. Compared to the conventional synchronization method for a broadband wireless system based on delay autocorrelation of a received signal, the method is advantageous in following aspects. Peak values of the cross-correlation function of the received signal and the local sequence are used as a determination basis for signal detection and system synchronization, and based on the determination basis, a symbol timing and frequency offset estimation method based on peak value detection is constructed. Compared with the delay auto-correlation function of the received signal, the peak values of the cross-correlation function of the received signal and the local sequence are less susceptible to noise and interference signals. By providing a normalized cross-correlation function, the method is adaptive to signal changes, effectively alleviating the problem of frame loss in the conventional synchronization method based on the delay autocorrelation of the received signal. In addition, the method has good resistance to noise and interferences, such that a large number of false synchronizations in an interference and noise condition can be avoided. The method has good robustness, and the performance of the method has been verified in actual systems.

DETAILED DESCRIPTION

To make the object, technical solutions and advantages of the present disclosure clearer, hereinafter technical solutions in the present disclosure are described clearly and completely in conjunction with the drawings in embodiments of the present closure. Apparently, the described embodiments are only some rather than all of the embodiments of the present disclosure. Any other embodiments obtained based on the embodiments of the present disclosure by those skilled in the art without any creative effort fall within the scope of protection of the present disclosure.

Figure 4:
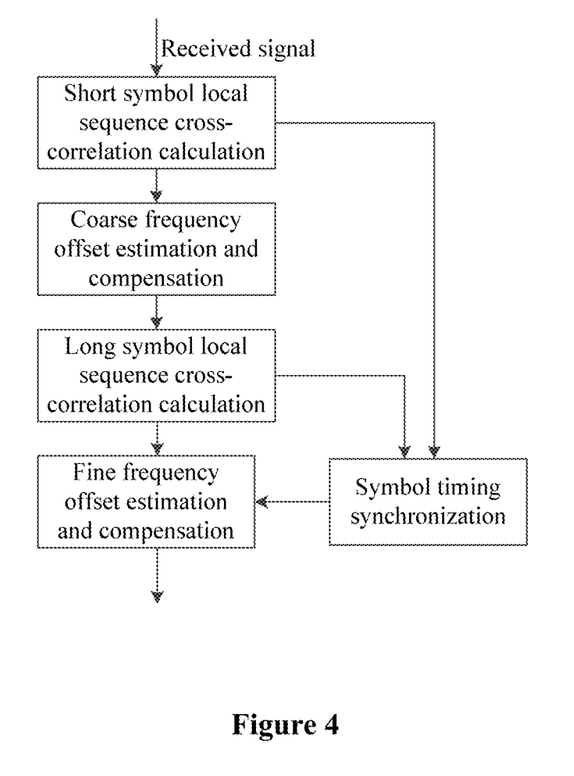
FIG. 4 is a block diagram of implementation of an anti-interference synchronization method for an OFDM system based on local sequence cross-correlation.

An anti-interference synchronization method for an OFDM system based on cross-correlation of a local sequence is provided according to the embodiments of the present disclosure, as shown in FIG. 4, the method includes: a short symbol local sequence cross-correlation calculation unit, a coarse frequency offset estimation and compensation unit, a long symbol local sequence cross-correlation calculation unit, a fine frequency offset estimation and compensation unit, and a symbol timing synchronization unit. In order to improve the stability and accuracy of symbol timing, it is considered to combine a cross-correlation value of a short symbol and a local sequence and a cross-correlation value of a long symbol and the local sequence to achieve symbol timing synchronization.

Figure 5:
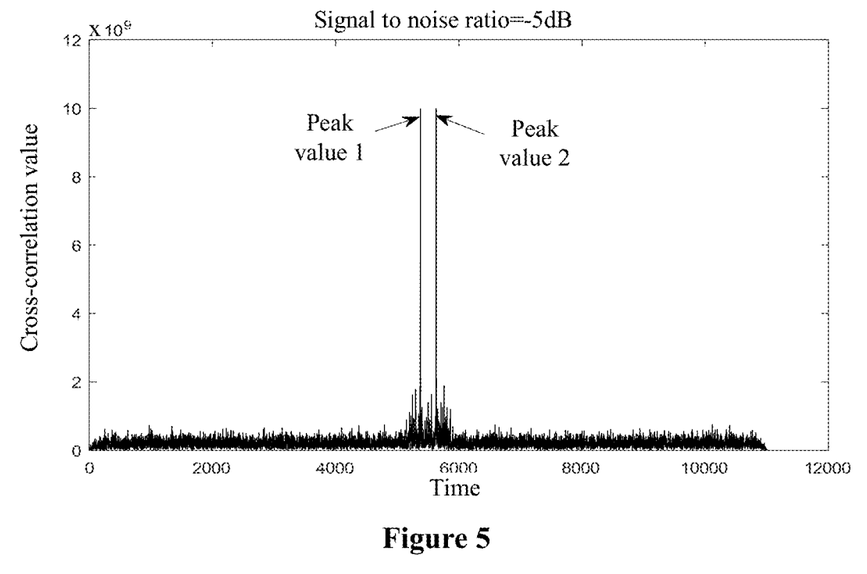
FIG. 5 is a schematic diagram of cross-correlation properties of a training sequence under a low signal-to-noise ratio condition.

It is an important guarantee for achieving a high-precision and high-stability synchronization algorithm to design a training sequence having good cross-correlation properties and a specific repetitive structure. A classic short symbol which has good cross-correlation properties used in IEEE 802.16 is to be used herein, and different repetitive structures may be obtained by interpolation processing of different multiples. For example, a two-segment repetitive structure may be obtained by performing two times interpolation processing and IFFT transformation, and a four-segment repetitive structure may be obtained after four times interpolation processing and IFFT transformation. FIG. 5 shows cross-correlation properties of a training sequence under a low signal-to-noise ratio condition. It can be seen from FIG. 5 that the training sequence designed according to IEEE 802.16 has good cross-correlation properties and has obvious peak value properties. Specifically, the training sequence has good cross-correlation properties and obvious peak values even under a low signal-to-noise ratio condition. Therefore, high-precision detection can be achieved even under a low signal-to-noise ratio condition.

Figure 6:
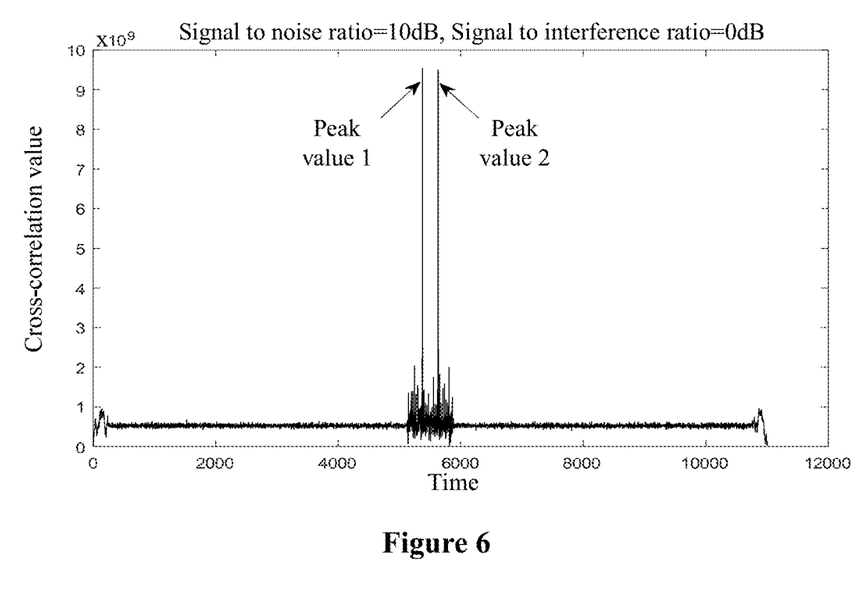
FIG. 6 is a schematic diagram of cross-correlation properties of a training sequence under an interference condition.

FIG. 6 shows cross-correlation properties of a training sequence under an interference condition. It can be seen from FIG. 6 that the training sequence has good cross-correlation properties and obvious peak value properties even under a strong interference condition. Therefore, high-precision detection can be achieved even under an interference condition.

Figure 7:
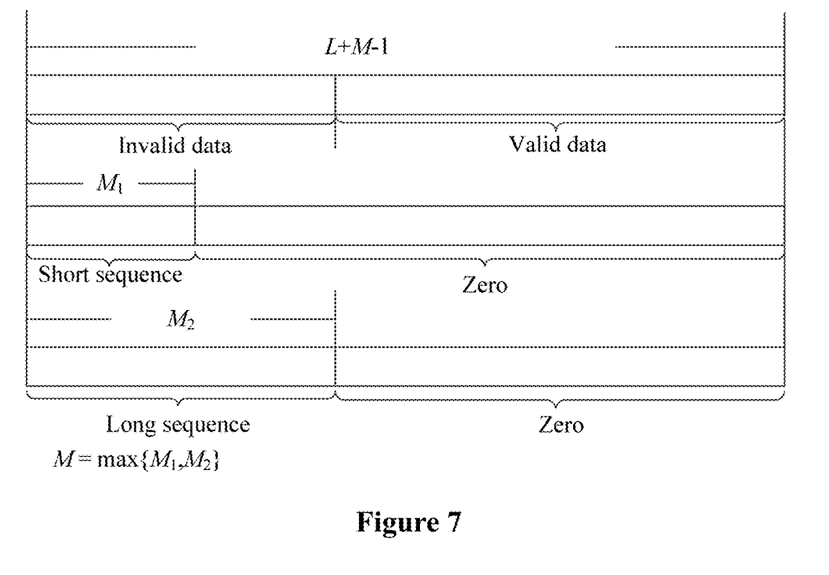
FIG. 7 is a schematic diagram of performing an overlapping reservation method on a received signal, a local short sequence, and a local long sequence.

As shown in 4, it is required to calculate a cross-correlation function of the received signal and the local short sequence and a cross-correlation function of the received signal and the local long sequence according to the present disclosure. Based on the above analysis, it is required to perform FFT transformation and IFFT transformation if the overlapping reservation algorithm is used to calculate the cross-correlation function of the received signal and the local sequence. In order to reduce hardware resources occupied in implementation, since the FFT transform and the IFFT transform have the same structure and only have differences in parameters, indicating that the FFT/IFFT transform may be implemented by selecting different configuration parameters, a unified implementation framework shown in FIG. 7 is provided according to the present disclosure, in which the short sequence has the same length as the long sequence after zero-filling the short sequence, such that FFT/IFFT transform units having same number of points are used to calculate the cross-correlation between the local short sequence and the received signal and the cross-correlation between the local long sequence and the received signal. In addition, since the FFT transform and the IFFT transform have the same structure, one FFT/IFFT module is shared in a time-sharing manner at a high clock frequency, such that the calculation of the cross-correlation between the local short sequence and the received signal and the calculation of the cross-correlation between the local long sequence and the received signal can be simultaneously performed by using the overlapping reservation algorithm, thereby greatly saving the required computing resources.

Figure 8:
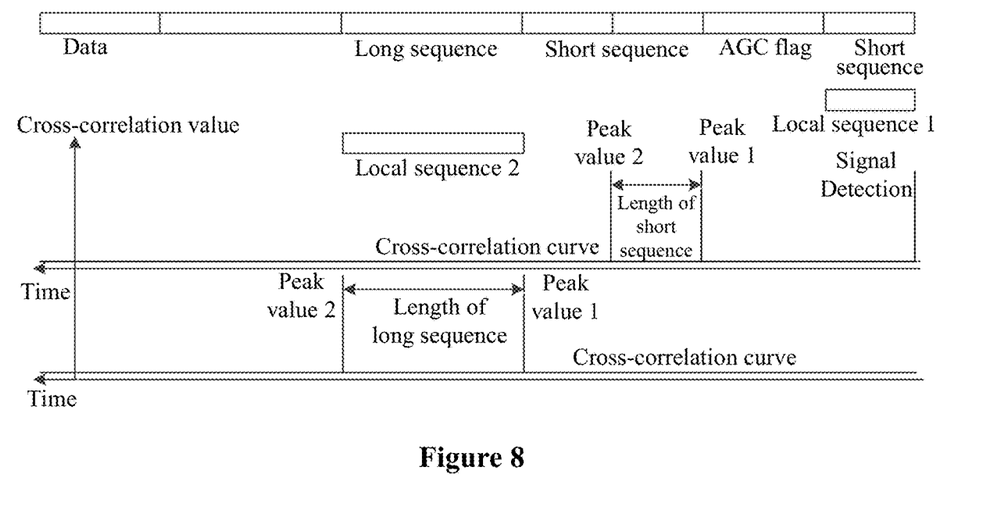
FIG. 8 is a schematic diagram showing a structure of a training sequence in an AGC control and synchronization method based on local sequence cross-correlation.

An anti-interference AGC control and synchronization method for an OFDM system based on cross-correlation of a local sequence is provided according to an embodiment of the present disclosure. An AGC control module works before a synchronization module. The AGC control module is configured to adjust a gain of the receiver to make the level of the received signal to be in an appropriate range, so as to provide a basis for normal operation of subsequent synchronization module and demodulation module at the receiver. However, in order to make the AGC module work properly, it is required to perform signal frame detection, that is, to detect whether a current received signal is noise or a user signal to ensure that the AGC module adjusts the gain for the user signal rather than noise, thereby reducing influence on the system. Conventional signal frame detection is generally performed by using an energy detection or a dual window energy detection method. However, the energy detection method is extremely susceptible to interference from glitches and noise, resulting in a very poor accuracy. According to the present disclosure, the cross-correlation between the received signal and the local signal is used to perform signal frame detection. Therefore, a training sequence structure shown in FIG. 8 is designed. Unlike the simple synchronization in the OFDM system, a short symbol is added in front of a signal to achieve signal detection. In this way, accurate real-time detection can be achieved to accurately control the AGC module to adjust the gain. The adjusted gain of the AGC module may be locked to avoid adjustment of the signal amplitude of a subsequent data section, improving adaptability of the system to environment. On this basis, the repetitive short sequences having a same structure and the repetitive long sequences having a same structure are used to respectively implement coarse frequency offset estimation and fine frequency offset estimation, which is similar to the above description.

In order to facilitate understanding of the technical solutions of the present disclosure, an anti-interference signal detection and synchronization method for a wireless broadband communication system according to an embodiment of the present disclosure is described below with reference to the drawings.

Figure 9:
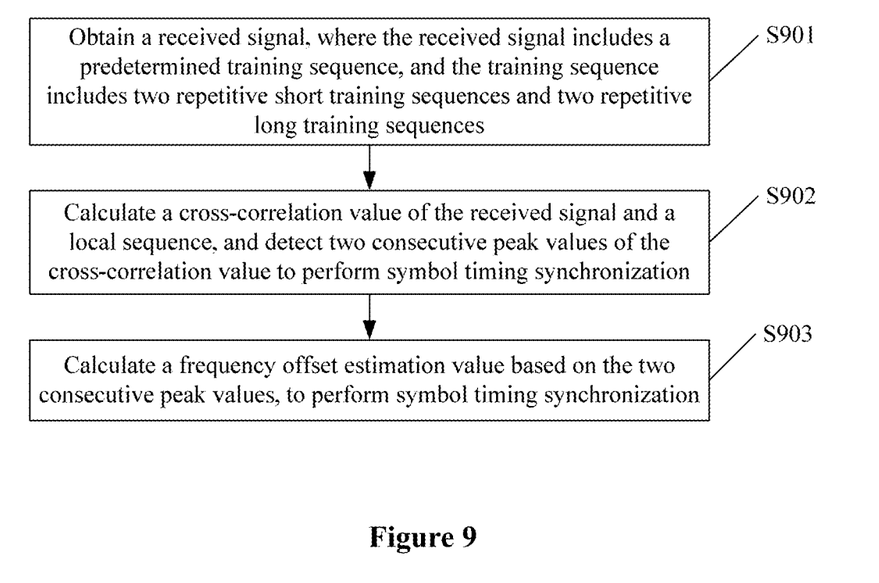
FIG. 9 is a flow chart of a data synchronization method for a wireless broadband communication system according to the present disclosure.

FIG. 9 is a flow chart of an anti-interference signal detection and synchronization method for a wireless broadband communication system according to an embodiment of the present disclosure. Referring to FIG. 9, the method includes following steps S901 to S903.

In step S901, a received signal is obtained. The received signal includes a training sequence that is predetermined, and the training sequence includes two repetitive short training sequences and two repetitive long training sequences.

The method according to the present disclosure is applied to a wireless broadband communication system, where the wireless broadband communication system refers to a communication system in which communication is performed based on wireless broadband communication technologies. The wireless broadband communication system may be an OFDM system or an SCFDE system.

Channel coding, QAM mapping, IFFT, and adding CP is performed on data sent by the system to obtain a signal, then the signal is transmitted via a wireless channel. A receiver receives the signal, and performs synchronization process on the received signal to ensure that processes such as QAM demapping, channel decoding can be correctly performed.

First, a received signal may be obtained. The received signal includes a predetermined training sequence, and the training sequence includes two repetitive short training sequences having a same structure and two repetitive long training sequences having a same structure. As an example, referring to FIG. 2, received data Data includes two repetitive long training sequences Long Preamble and two repetitive short training sequences Short Preamble.

In step S902, a cross-correlation value of the received signal and a local sequence is calculated, and two consecutive peak values of the cross-correlation value are detected to perform symbol timing synchronization.

The local sequence has a same structure as the predetermined training sequence. The predetermined training sequence includes long training sequences and short training sequences. Correspondingly, the local sequence includes a local sequence corresponding to the long training sequence and a local sequence corresponding to the short training sequence. For convenience of expression, the local sequence corresponding to the short training sequence may be referred to as local sequence 1, and the local sequence corresponding to the long training sequence may be referred to as local sequence 2. As shown in FIG. 2, a length of the local sequence 2 is the same as the length of the long training sequence, and a cross-correlation value of the long training sequence and the local sequence 2 may be calculated; a length of the local sequence 1 is the same as the length of the short training sequence, and a cross-correlation value of the short training sequence and the local sequence 1 may be calculated. The cross-correlation function of the received signal and the local sequence is calculated by using equation (6), which is not repeated here.

If the wireless broadband communication system is a burst OFDM system, the cross-correlation value of the received signal and the local sequence may be calculated by using equation (9). As a possible implementation, equation (9) may be implemented by a multiplier. Specifically, the multiplier may be used to multiply $x_{Local}^*(n)$ by $y_{offset}(n+m)$, and the products are accumulated to obtain the cross-correlation value of the received signal and the local sequence. In another possible implementation according to the present disclosure, above equation (9) may be implemented by Fourier transform, thus the problem that the multiplier occupies too many resources can be solved.

In some cases, a normalized cross-correlation function may be used to calculate the cross-correlation value of the received signal and the local sequence. The normalized cross-correlation function may refer to above equation (11), which is not repeated here. It should be noted that the normalized cross-correlation function is not to be affected by the level of the received signal, and influences such as noise on the peak value detection of the cross-correlation function can be further reduced with the normalized cross-correlation function to improve the stability of peak value detection.

A sharp correlation peak value appears in the amplitude of the cross-correlation function of the received signal and the local sequence if the received signal includes a signal that is the same as the local sequence (or has a certain difference from the local sequence), and the cross-correlation function is close to zero at other positions since the training sequence has good autocorrelation. The training sequence includes two adjacent repetitive sequences, thus two consecutive peak values appear in the cross-correlation function of the received signal and the local sequence. Therefore, symbol timing synchronization can be achieved by accurately detecting the two peak values, and the symbol timing synchronization has high stability and accuracy.

In step S903, calculating a frequency offset estimation value by using the two consecutive peak values, so as to implement carrier synchronization.

Based on the repetitive structure of the training sequence, two consecutive peak values separated apart by a sequence length appear in an absolute value of the cross-correlation function of the received signal and the local sequence. Without considering noise, the two consecutive peak values satisfy a relationship expressed by equation (7). Based on equation (7), an equation for calculating an estimated value of the normalized frequency offset may be obtained, as expressed by equation (8), which is not repeated here.

It can be seen from equation (8) that an estimated range of the normalized frequency offset $\varepsilon$ is related to a length M of the training sequence. For a certain value of M, a phase of a correlation value corresponding to the normalized frequency offset $\varepsilon$ is to be blurred if the normalized frequency offset $\varepsilon$ exceeds a certain range. Therefore, following conclusions may be obtained: a larger M indicates a smaller estimated range of the normalized frequency offset $\varepsilon$ and a higher estimation accuracy, and a smaller M indicates a larger estimated range of the normalized frequency offset $\varepsilon$ and a lower estimation accuracy.

Since the carrier frequency offset CFO is large in an initial stage of the synchronization, a technique is required to estimate a CFO having a large range. Therefore, a training sequence used in an actual system is designed to have a structure as shown in FIG. 2. where the short training sequence is used to perform coarse CFO estimation and compensation. Based on this, the long training sequence is used to perform fine CFO estimation and compensation.

An anti-interference signal detection and synchronization method for a broadband wireless system based on detection of peak values of a cross-correlation function of a local sequence according to the present disclosure is described above. Peak values of the cross-correlation function of the received signal and the local sequence are used as a determination basis for signal detection and system synchronization, and based on the determination basis, a symbol timing and frequency offset estimation method based on peak value detection is constructed. Compared with a delay auto-correlation function of the received signal, the peak values of the cross-correlation function of the received signal and the local sequence are less susceptible to noise and interference signals.

Furthermore, a normalized cross-correlation function is provided according the present disclosure. A cross-correlation value is calculated by using the normalized cross-correlation function, and the method based on the cross-correlation value is adaptive to signal changes, thereby effectively alleviating the problem of frame loss in the synchronization method based on the delay autocorrelation of the received signal. In addition, the method has good resistance to noise and interference, such that a large number of false synchronizations in an interference and noise condition can be avoided. Therefore, the method has good robustness.

Specific embodiments of the present disclosure are disclosed as described above, but the scope of protection of the present disclosure is not limited thereto. Changes and alteration which may be thought in the technical scope disclosed by the present disclosure by one skilled in the art should fall within the scope of protection of the present disclosure. Therefore, the scope of protection of the present disclosure should be defined by the appended claims.

The invention claimed is:

1. An anti-interference signal detection and synchronization method for a wireless broadband communication system, comprising:
calculating a cross-correlation value of a received signal and a local sequence by using an equation (6), wherein the local sequence has a same structure as a training sequence structure, the training sequence structure comprises two repetitive short training sequences and two repetitive long training sequences, each of the short training sequence and the long training sequence is a pseudo-random sequence having autocorrelation which is expressed by an equation (5):

$$R(m) = \sum_{n=0}^{M-1} x(n+m)x^*(n) \xrightarrow{m \neq 0} 0 \qquad (5)$$

wherein, m represents an offset of the sequence, M represents a length of the sequence, and $(.)^*$ represents a conjugate operation, the short training sequence has close cross-correlation with the long training sequence, the short training sequence is not correlated with the long training sequence, and wherein based on auto-correlation and cross-correlation of the long training sequence and the short training sequence, a cross-correlation function of the received signal and the local sequence is expressed by the equation (6):

$$R(m) = \sum_{n=0}^{M-1} y_{offset}(n+m)x_{Local}^*(n) \qquad (6)$$

wherein, M represents a length of the local sequence, m represents an offset of the local sequence, $(.)^*$ represents a conjugate operation, and $x_{Local}^*(n)$ represents a conjugate of the local sequence;

determining two consecutive peak values separated from each other by a sequence length based on an absolute value of the cross-correlation function of the received signal and the local sequence, wherein the two consecutive peak values satisfy a relationship expressed by an equation (7):

$$R^\Delta(M+m) = R^\Delta(m)e^{j2\pi M/N} \qquad (7)$$

wherein, $R^\Delta(m)$ represents a peak value of a cross-correlation curve of the received signal and the local sequence, M represents the length of the sequence, $\varepsilon$ represents a normalized frequency offset, and $j=\sqrt{-1}$; and obtaining an estimated value $\hat{\varepsilon}$ of the normalized frequency offset $\varepsilon$ based on the equation (7):

$$\hat{\varepsilon} = \frac{N}{M2\pi} \angle(R^{\Delta}(M+m) conj(R^{\Delta}(m))) \qquad (8)$$

wherein, conj(.) represents a conjugate operation, and $\angle$ represents an operation for obtaining a phase between $(0, 2\pi]$, and wherein the calculating the cross-correlation value by using the equation (6) comprises calculating the cross-correlation value by using an equation (9):

$$R(m) = \sum_{n=0}^{\infty} y_{offset}(n+m) x_{Local}^*(n) = y_{offset}(n) \otimes x_{Local}(-n) \qquad (9)$$

wherein, $x_{Local}^*(n)$ represents the conjugate of the local sequence, $y_{offset}(n)$ represents a time domain sample of the received signal, and $\otimes$ represents a convolution operation.

2. The method according to claim 1, wherein an operation expressed by the equation (9) is performed by using fast Fourier transform by:
adding M−1 pieces of data of a trailer of a previous data frame to a header of a current data frame of the received signal, wherein M−1 0s are added to a header of a first data frame, and
segmenting each data frame into a plurality of data segments each having a length of P+M−1, wherein two consecutive data segments among the plurality of data segments have M−1 pieces of overlapping data, and P is selected under a condition that P+M−1 is an integer power of 2, to facilitate IFFT/FFT transformation.

3. The method according to claim 1, further comprising:
normalizing the cross-correlation function of the received signal and the local sequence expressed by the equation (6) according to Passaval's theorem to obtain a normalized cross-correlation function expressed by an equation (11):

$$R_{norm}(m) = \frac{\sum_{n=0}^{M-1} y_{offset}(n+m) x_{Local}^*(n)}{1/2(\sum_{n=0}^{M-1} |y_{offset}(n+m)|^2 + \sum_{n=0}^{M-1} |x_{Local}(n)|^2)} \qquad (11)$$

wherein, M represents the length of the local sequence, m represents the offset, $(.)^*$ represents a conjugate operation, $x_{Local}^*(n)$ represents the conjugate of the local sequence, and $y_{offset}(n)$ represents a time domain sample of the received signal.

4. An anti-interference signal detection and synchronization method for a wireless broadband communication system, comprising:
obtaining a received signal, wherein the received signal comprises a predetermined training sequence, and the predetermined training sequence comprises two repetitive short training sequences and two repetitive long training sequences;
calculating a cross-correlation value of the received signal and a local sequence, and detecting two consecutive peak values of the cross-correlation value to perform symbol timing synchronization, wherein the local sequence is the same as the predetermined training sequence; and
calculating a frequency offset estimation value based on the two consecutive peak values, to perform carrier synchronization, wherein the calculating the cross-correlation value of the received signal and the local sequence comprises:
calculating the cross-correlation value of the received signal and the local sequence by using an equation:

$$R(m) = \sum_{n=0}^{M-1} y_{offset}(n+m) x_{Local}^*(n),$$

wherein, $x_{Local}^*(n)$ represents a conjugate of the local sequence, $y_{offset}(n)$ represents a time domain sample of the received signal, and M represents a length of the local sequence.

5. The method according to claim 4, wherein the wireless broadband communication system is a burst OFFDM system, and the calculating the cross-correlation value of the received signal and the local sequence comprises:
calculating the cross-correlation value of the received signal and the local sequence by using an equation:

$$R(m) \sum_{n=0}^{\infty} y_{offset}(n+m) x_{Local}^*(n) = y_{offset}(n) \otimes x_{Local}(-n),$$

wherein, $x_{Local}^*(n)$ represents the conjugate of the local sequence, $y_{offset}(n)$ represents the time domain sample of the received signal, and $\otimes$ represents a convolution operation.

6. The method according to claim 5, wherein a multiplier is used to implement the equation:

$$R(m) = \sum_{n=0}^{\infty} y_{offset}(n+m) x_{Local}^*(n) = y_{offset}(n) \otimes x_{Local}(-n),$$

wherein, $x_{Local}^*(n)$ represents the conjugate of the local sequence, $y_{offset}(n)$ represents the time domain sample of the received signal, and $\otimes$ represents the convolution operation.

7. The method according to claim 5, wherein Fourier transform is used to implement the equation:

$$R(m) = \sum_{n=0}^{\infty} y_{offset}(n+m) x_{Local}^*(n) = y_{offset}(n) \otimes x_{Local}(-n),$$

wherein, $x_{Local}^*(n)$ represents the conjugate of the local sequence, $y_{offset}(n)$ represents the time domain sample of the received signal, and represents the convolution operation.

8. An anti-interference signal detection and synchronization method for a wireless broadband communication system, comprising:
obtaining a received signal, wherein the received signal comprises a predetermined training sequence, and the predetermined training sequence comprises two repetitive short training sequences and two repetitive long training sequences;
calculating a cross-correlation value of the received signal and a local sequence, and detecting two consecutive peak values of the cross-correlation value to perform symbol timing synchronization, wherein the local sequence is the same as the predetermined training sequence; and
calculating a frequency offset estimation value based on the two consecutive peak values, to perform carrier synchronization, wherein the calculating the cross-correlation value of the received signal and the local sequence comprises:
calculating the cross-correlation value of the received signal and the local sequence by using a normalized cross-correlation function, the normalized cross-correlation function being expressed as:

$$R_{norm}(m) = \frac{\sum_{n=0}^{M-1} y_{offset}(n+m) x_{Local}^*(n)}{0.5(\sum_{n=0}^{M-1} |y_{offset}(n+m)|^2 + \sum_{n=0}^{M-1} |x_{Local}(n)|^2)},$$

wherein, M represents a length of the local sequence, m represents an offset, $(.)^*$ represents a conjugate operation, $x_{Local}^*(n)$ represents a conjugate of the local sequence, and $y_{offset}(n)$ represents a time domain sample of the received signal.

* * * * *